(12) United States Patent
Miller et al.

(10) Patent No.: US 7,110,717 B2
(45) Date of Patent: Sep. 19, 2006

(54) LEADER-FOLLOWER POWER CONTROL

(75) Inventors: Mark J. Miller, Encinitas, CA (US); John H. O'Neill, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 228 days.

(21) Appl. No.: 10/903,126

(22) Filed: Jul. 30, 2004

(65) Prior Publication Data

US 2006/0030351 A1 Feb. 9, 2006

(51) Int. Cl.
*H04B 7/185* (2006.01)

(52) U.S. Cl. .................. 455/13.4; 455/10; 455/69; 455/427; 455/522

(58) Field of Classification Search ............. 455/522, 455/69, 13.4, 427, 10
See application file for complete search history.

(56) References Cited

U.S. PATENT DOCUMENTS 4,941,199 A 7/1990 Saam 6,335,920 B1 * 1/2002 Strodtbeck et al. ......... 370/318
2002/0137457 A1 * 9/2002 Nivens et al. ............. 455/13.4
2003/0040274 A1 * 2/2003 Dai et al. .................. 455/13.4

OTHER PUBLICATIONS

Saam, "Uplink Power Control Technique For VSAT Networks," IEEE Proceedings 1989 Southeastcon, pp. 96-101.

* cited by examiner

*Primary Examiner*—Matthew Anderson
*Assistant Examiner*—Sanh Phu
(74) *Attorney, Agent, or Firm*—Townsend and Townsend and Crew LLP

(57) ABSTRACT

In a satellite or other relayed communication system having a plurality of subscriber terminals that communicate through an elevated wireless relay (typically a satellite operating in bent pipe mode), a technique for subscriber terminal power control is provided whereby the power level is controlled via leader-follower operation relying on sharing control factors determined at a single calibrated subscriber terminal transmitter (the leader terminal) to create traffic to be compared to the received traffic of the other subscriber terminals. The power level of the subscriber terminals is then adjusted based on the relationship of their received energy to the received energy of the leader terminal.

31 Claims, 8 Drawing Sheets

LEADER-FOLLOWER POWER CONTROL

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

This invention relates to signal power level regulation in a satellite or other wireless relayed communications network. In a satellite communication environment, power control is the process in which interactive terminals adjust their EIRP such that all transmissions arrive at the satellite and/or the destination receiver at an appropriate signal level. As uplink fades occur, for example as caused by excessive moisture in the signal path caused by rain or other weather, the power control system causes the interactive terminal's EIRP to increase such that the signal still arrives at the satellite at the desired level. If the interactive terminal runs out of EIRP to compensate for the rain fade, then the interactive terminal can reduce its data rate and set its EIRP such that the resulting Eb/No at the satellite is the same as the Eb/No for all other interactive terminals. This dual control of both EIRP and data rate is more accurately termed an energy control system, although the term power control is generally used in the industry.

FIGS. 1 and 2 illustrate an exemplary satellite environment used to describe the subject invention. In FIG. 1 showing a satellite communication system 100, a hub 101 transmits via a forward uplink transmission 120 to a communications relay satellite 102, which then re-broadcasts the transmission to a number of subscriber terminals (STs) ST111–ST118 over a forward downlink signal 122. In general, the hub 101 broadcasts continuously and is also able to receive its own forward downlink 122.

FIG. 2 depicts the return transmissions of satellite communication system 100. Here, each subscriber terminal ST111–ST118 transmits a return uplink signal to satellite 102 on the return uplink 132. The satellite 102 then retransmits the return signals to the hub 101 using return downlinks 130. The return transmissions are typically sporadic and/or bursty in nature, and often the subscriber terminals ST111–ST118 cannot receive their signal on their own return downlink 130.

FIGS. 1 and 2 depict an example wherein some of the communication transmissions experience propagation degradation, including weather-induced fade, which is illustrated here as an example. There are many other sources of transmission degradation, for example, a mobile subscriber terminal could be deployed under foliage that degrades transmission.

In FIG. 1, a light rain attenuates the forward uplink 120. This attenuation will affect the power received at the satellite 102 and thus the power eventually relayed to all subscriber terminals ST111–ST118. The forward downlink 122 is also degraded for some subscriber (user) terminals. In this example, subscriber terminals ST111 and ST112 are under heavy rain and thus experience further severe signal degradation. Subscriber terminals ST113 and ST114 are under light rain and thus experience further moderate signal degradation. Subscriber terminals ST115 and ST116 are under cloud cover and thus experience further minimal signal degradation. Subscriber terminals ST117 and ST118 are under clear sky and thus experience no further signal degradation.

In FIG. 2, the return uplink 132 is attenuated by the same conditions that affect the forward downlink 122 of FIG. 3. Subscriber terminals ST111 and ST122 are under heavy rain and thus their return uplinks 132 experience severe signal degradation. Subscriber terminals ST113 and ST114 are under light rain and thus their uplinks 132 experience moderate signal degradation. Subscriber terminals ST115 and ST116 are under cloud cover and thus their uplinks 132 experience minimal signal degradation. Subscriber terminals ST117 and ST118 are under clear sky and thus their uplinks 132 experience no signal degradation. Thus, in an uncompensated system, the return uplink signals 132 are received at satellite 102 with widely varying power levels due to the varying transmission conditions. The return downlink signals 130 all receive further degradation (notably the same degradation for all return downlink signals) due to the light rain at the hub 101.

In general, the forward and return channels, and even the uplinks and downlinks, can be on different frequencies. These different frequencies may be attenuated differently by the same channel conditions. For the description of the subject invention, the assumption will be made that any such differences in attenuation can be compensated for.

In the satellite communication industry, much effort has been expended on the problem of power control. For example, "Uplink Power Control Techniques for VSAT Networks," Thomas Saam, *IEEE Southcon* 1989, pgs. 96–101. Therein the author describes a technique wherein the hub receives its own signal and removes half of the attenuation to keep the signal level constant at the satellite, a technique described further in U.S. Pat. No. 4,941,199, now commonly owned with the subject invention. The author off the IEEE article also discusses five general categories for transmit power control: Static margin, independent control, centralized control, pilot control, and pair control. Static margin is basically null power control: the power level is set so that there will always be a valid signal received. The excess signal during clear sky conditions is wasted, and the network capacity is thus reduced. Under independent control, subscriber terminals monitor their own conditions and compensate locally. Under centralized control, a central controller broadcasts uplink fade estimates to the other terminals. Under pilot control, each subscriber terminal monitors a beacon or pilot to estimate its uplink fade. Under pair control, subscriber terminals exchange fade estimates with each other.

In the past power control has typically been implemented via a satellite beacon. A terminal receives a beacon signal from the satellite and determines the signal strength. An uplink power control unit uses this beacon signal strength estimate to adjust the power of the terminal's transmission to exactly compensate for the current attenuation of the signal. This technique works very well and is appropriate for high value, high cost terminals, such as a hub. For the subscriber terminals, however, which are typically relatively low-cost, of limited capability, and often very compact, this technique has severe limitations, such as a need for an extra (beacon) receiver, a precision uplink power control attenuation system, and calibration equipment, as examples.

FIG. 3 shows a subset of the components of a hub 101 useful to describe previously employed processes of power control on the forward uplink and the return uplink. The forward data is modulated by the forward modulator 230, which is then typically interfaced to an uplink power control unit 220 via an IF link. (Typical IF frequencies for such an interface are 50–180 MHz or 950–1450 MHz). The modulator 230, shown here as a single unit, may comprise a number of units. For example, if a spread spectrum multiplexing scheme were employed on the forward channel, then a number of modulators with different sources could be summed together to create a composite forward signal. Likewise, the forward modulator 230 may be used to deliver messages from the hub 101 to all subscriber terminals, as will be described hereinafter in connection with a description of the invention.

The power control unit 220 applies a variable attenuator to its input signal (or signals) to create a power compensated signal. The power compensated signal is then transmitted via the transceiver 200 and antenna 250, resulting in a forward uplink signal that is received by the communication relay satellite 102. From the satellite 102 to the antenna 250 is the return downlink (from the subscriber terminals) and a beacon downlink (from the satellite). The forward downlink (not shown) of the hub 101 can operate as the beacon downlink under some conditions.

The received signals at the antenna 250 are then processed by the receiver portion of the transceiver 200 at the hub 101 and passed along (typically at IF) to a beacon receiver 210 and to a return demodulator 240, which provides the return data to the hub. The return demodulator 240 may be a multi-channel demodulator, as in the case of multiple simultaneous return transmissions, such as those encountered in a spread spectrum multiple access system.

The beacon receiver 210 is intended to accurately determine the amplitude of the received beacon and to pass this signal strength to the uplink power control unit 220 to enable the uplink power control unit to create an amplitude-compensated signal. Generally, such beacon receivers are calibrated under clear sky or minimum signal degradation conditions. Thus, any drop in power in the received beacon signal can be attributed to a fade condition on the beacon downlink signal, which corresponds to a fade in the forward uplink signal. This uplink fade is compensated for by the uplink power control unit 220.

FIG. 3 further illustrates internal components of the hub 101 in the application of power control to the return uplink. The received return downlink and the beacon downlink signals at the transceiver 200 again feed the beacon receiver 210 and the return demodulator 240. An estimate of the quality of each subscriber terminal transmission is made in a quality estimator 260. A typical metric of signal quality is the energy per bit divided by the noise density, also known as $E_b/N_o$. This metric can be used to predict the bit error rate performance of the channel and other useful performance attributes, based on well known detection and estimation theory concepts. Another example metric is a direct estimate of the bit error rate, perhaps coming from an error correcting decoder. In general, these signal quality estimates cannot provide an accurate measure of the return signal level at any one point of interest, for example, at the satellite receiver.

In this example hub of FIG. 3, a network management system 270 sends messages to each terminal via the forward modulator 230 in order to direct each user terminal to an appropriate power level, data rate, center frequency, and/or modulation type to maintain the desired signal quality at the hub receiver. This method is generally useful if the absolute power of the return signals is not of concern.

What is needed, therefore, is a method for satellite or other relayed communication system power control which does not require additional or expensive components and calibration of the subscriber terminals and which can also provide absolute power level control.

SUMMARY OF THE INVENTION

According to the invention, in a satellite or other relayed communication system having a plurality of subscriber terminals that communicate through an elevated wireless relay (typically a satellite operating in bent pipe mode), a technique for subscriber terminal power control is provided whereby the power level is controlled via leader-follower operation relying on sharing control factors determined at a single calibrated subscriber terminal transmitter (the leader terminal) to create traffic to be compared to the received traffic of the other subscriber terminals. The power level of the subscriber terminals is then adjusted based on the relationship of their received energy to the received energy of the leader terminal. Two specific embodiments are disclosed: a hub-spoke configuration in which all traffic is routed through a hub, and a mesh configuration in which subscriber terminals can communicate directly with one another via the relay/satellite link.

In a specific embodiment, the leader terminal may optionally be collocated with the hub equipment and may share the uplink power control and transceiver of the hub. The energy of the subscriber terminals can be measured in a number of ways, including power detection during the demodulation of the traffic data. Energy comparison to the leader terminal can then be accomplished by subtracting the estimated user power level from the estimate of the leader's power level. Adjustment of the subscriber terminal's power level can be accomplished by sending messages from the hub or by other communication means.

The invention will be better understood by reference to the following detailed description in connection with the following drawings.

DESCRIPTION OF SPECIFIC EMBODIMENTS OF THE INVENTION

Figure 4:
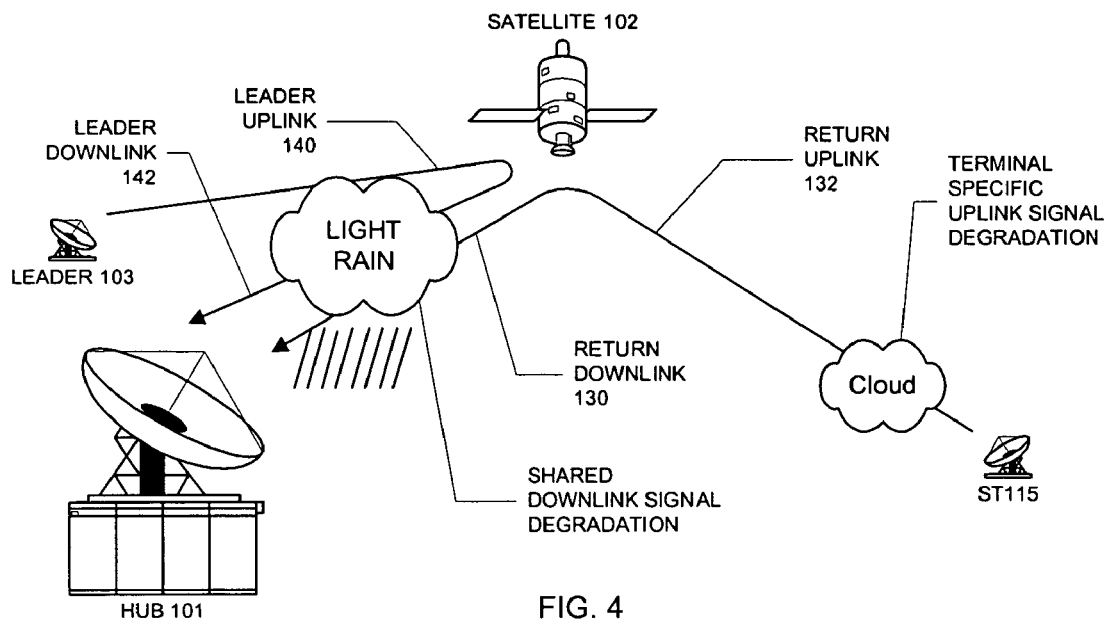
FIG. 4 is a block diagram showing an exemplary channel condition in one embodiment of the leader follower power control.

Referring to FIG. 4, an exemplary environment of the hub-spoke embodiment of the subject invention is illustrated. For clarity, only one subscriber terminal ST115, under cloud cover, is shown, although it is to be understood that many such subscriber terminals may be operating at the same time. As discussed previously, the subscriber terminal ST115 transmits to a relay, in this case a bent-pipe satellite relay 102, using the return uplink signal 132, and the satellite 102 re-broadcasts relays this uplink signal at a signal strength based on the sensed signal strength of the received signal as the return downlink signal on path 130. The hub 101 in this example experiences a light rain fade condition that affects the return downlink path 130. A leader transmitter 103 employs a calibrated signal path in broadcasts of a leader uplink signal on path 140. In specific applications, the leader transmitter 103 is located in the same area as the hub 101 and in fact may be incorporated into the hub 101 as described hereinafter.

According to the invention, all signals are selected to be received into the satellite 102 at a "correct" level. To this end, a known, calibrated, signal on path 140 from the leader transmitter 103 is received at the communications relay satellite 102. It is understood that the satellite 102 is operating as a bent pipe or analog link amplifier. The signal power into the satellite 102 impacts the power output from the satellite 102, since the satellite is operating in a so-called bent-pipe mode. This signal on path 140 is then re-transmitted by the satellite 102, creating a calibrated leader downlink signal on return path 142. This calibrated leader downlink signal, any beacon downlink signals associated with the satellite 102 and the hub 101, and all ST return downlink signals on downlink path 130 thus experience the same signal degradation in the downlink paths from the satellite 102 to the hub 101 due to the local conditions at the hub 101.

By comparing, at the hub 101, the power levels of the received leader downlink signal on leader downlink path 142 with the power levels on the ST return downlink path 130, the hub can determine the power level of the return uplink signal 132 from the subscriber terminals at the satellite receiver and thus to the hub 101. This power level is a function of a number of factors, primarily the signal degradation experienced by the return uplink 132, but also by terminal-specific factors, such as component tolerances, component aging, antenna pointing, and the like. The power level determination is made possible by calibration of the leader uplink signal on the leader uplink path 140 and by calibration of the satellite downlink signal to the hub 101. To facilitate the calibration, the leader transmitter 103 communicates a message to the hub 101. The data content of this message is irrelevant. However, the power level of the signal received at the hub from the satellite is used at the hub to correlate with the calibration of the leader uplink signal. By removing ambiguities on the nature and power level of the signal transmitted by the leader terminal 103 to the satellite 102, the power levels needed to transmit traffic from the ST terminals can be determined by the hub 101. To this end, the hub 101 typically contains a network management system 270 (e.g., FIG. 6) which analyzes the power level and determines the power needed to communicate a given power level. The NMS 270 then sends a control message to the subscriber terminal ST115 to adjust the power level of the return uplink 132.

Figure 5A:
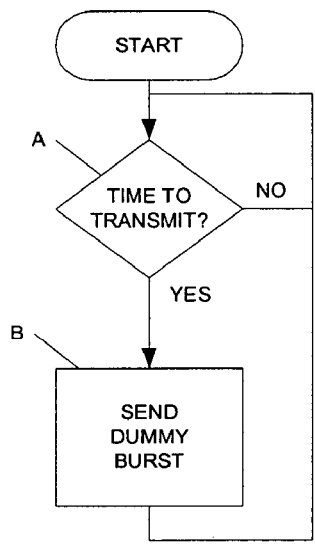
FIG. 5A is a flow chart of the power control operation of the leader transmitter in accordance with one embodiment of the subject invention.

FIG. 5A is a simplified flow chart of the operation of the transmitter of the leader terminal 103. Occasionally and/or periodically, the transmitter decides whether it is time to send dummy data to the hub 101 through the aforementioned leader uplink 140 and downlink 142 (Step A). The data is typically sent in bursts at the designated time to transmit (Step B) and the process repeats. If this data is transmitted in short bursts as compared to the cycle of transmission, the timing of the bursts may be regular or aperiodic, depending on the system design. In a system used to transmit network traffic, for example, a dummy data burst can be generated, complete with a destination address (perhaps to the hub 101). If this dummy data is transmitted periodically or even continuously, there is no need to either sense or calculate the time of expected transmission. The packets themselves may contain information sufficient to establish that the data sent is dummy data for calibration.

The leader terminal may transmit on its own volition, or under the control of the hub 101. In general, the leader terminal 103 needs to transmit often enough to follow the dynamics of the channel between the hub 101 and the satellite 102. The number and length of these transmissions, however, is preferably limited to minimize the added load to the communications network. The tradeoff between network loading and following the dynamics of the channel is a system-dependent design decision that depends on such factors as desired system capacity and allowable time-dependent power deviations of the subscriber terminals ST111–ST118.

Figure 5B:
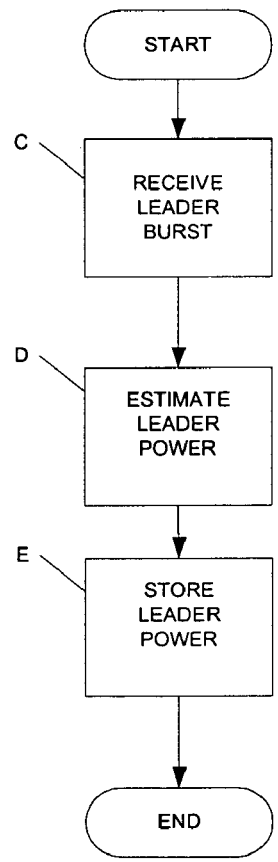
FIG. 5B is a flow chart of the leader burst reception portion of the power control operation in accordance with one embodiment of the subject invention.

FIG. 5B is a flow chart illustrating decision operation at the hub 101 upon receipt of the leader burst in this exemplary embodiment. First (Step C) the hub receives the transmission (Step C), then it estimates the power in the received transmission, typically a burst, using any of a number of techniques well known in the art (Step D) and then it records the power estimate for later use (Step E). Multiple power measurements can be used to estimate the leader power. For example, if a large number of short bursts is sent relatively frequently, an average of the power can be used as the estimate of the leader power. On the other hand, the use of longer, less frequent bursts could enable the system designer to rely on the latest estimate with a high degree of confidence. While the actual data in the leader burst is not required for this portion of the power control method, this data may still be useful. For example, the data could be used to identify the burst as originating at the leader, and/or it could be encoded dummy data with an error detection code so that the receiver could better estimate burst power.

Figure 5C:
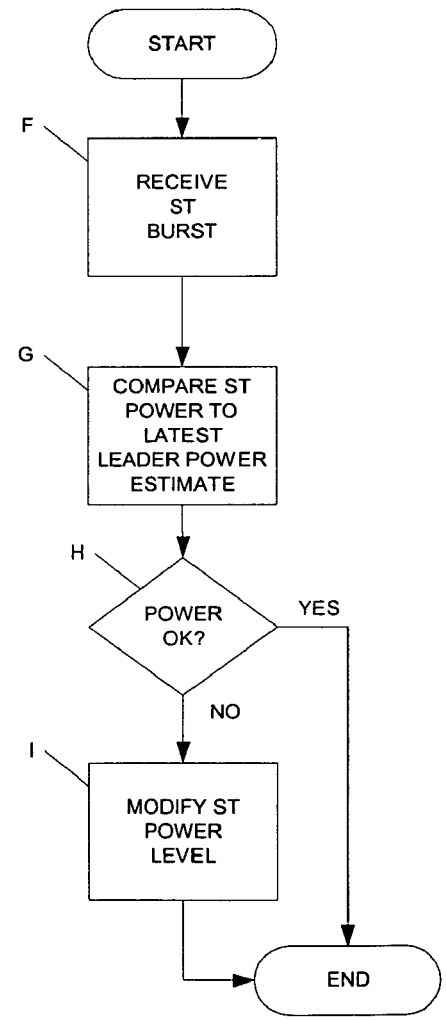
FIG. 5C is a flow chart of the ST burst reception portion of the power control operation in accordance with one embodiment of the subject invention.

FIG. 5C is a flow chart describing operation at the hub upon receipt of a subscriber terminal (ST) burst (Step F) in accordance with this exemplary embodiment of the invention. As with the leader burst, the power of the ST burst is estimated and compared to the stored estimated power of the leader transmitter (Step G). This estimate is obtained via the procedure in FIG. 5B, Step E., If the received power of the ST burst is considered to be reasonable in light of the estimated leader power (Step H), then no action is taken. If, however, the ST power is consider inappropriate in light of the estimated leader power, then a further step is taken to adjust the power of the subscriber terminal ST (Step I). A number of techniques can be used to adjust the ST power. Typically, a message to the ST generated by the network management system 270 and modulated by the forward modulator 230 is sent to the appropriate subscriber terminal to cause the power to be adjusted locally.

Figure 6:
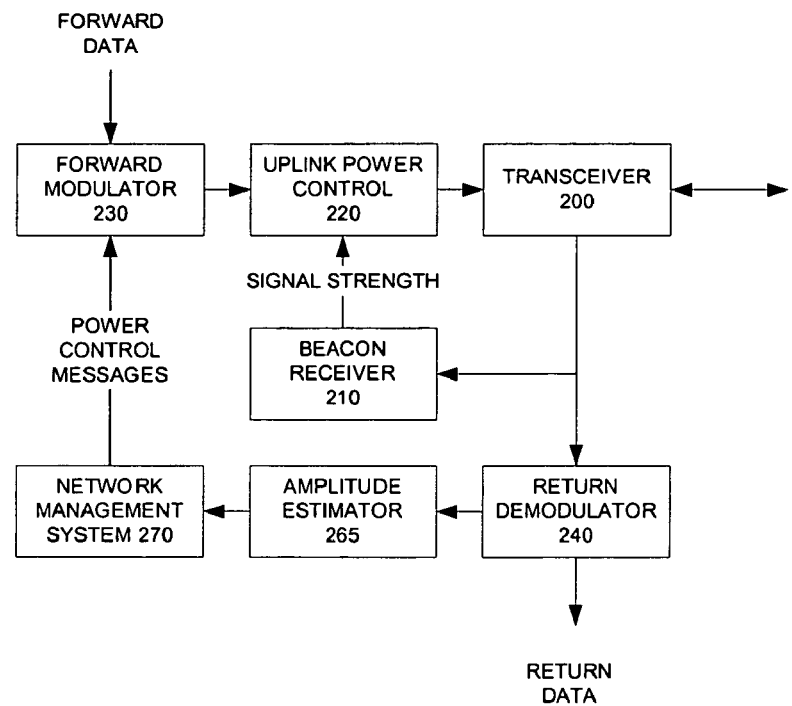
FIG. 6 is a block diagram showing an exemplary implementation of the hub portion of a power control system according to one embodiment of the invention.

FIG. 6 illustrates internal components of the hub 101 in the application of power measurement power control to the return uplink using power level measurements. Forward data is again modulated by the forward modulator 230, which then interfaces to the uplink power control unit 220 via, for example, an IF link. The power compensated signal is then transmitted via the transceiver 200 to the antenna 250 (FIG. 5). The received return downlink and the beacon downlink signals at the transceiver 200 again feed the beacon receiver 210 and the return demodulator 240. However, an estimate of the amplitude of each subscriber terminal transmission is made in an amplitude estimator 265, as opposed to the quality estimator 260 of FIG. 3. Lacking any concrete reference, the amplitude estimates are essentially relative to each other, whereas the quality estimates of FIG. 3 can be used in an absolute sense in order to adjust the power of the terminals. A network management system 270 can thus send power control messages to each terminal via the forward modulator 230 in order to direct each user terminal to an appropriate power level. This system has not heretofore been used in the industry due to the above mentioned situation: it is generally easy to determine the signal quality through conventional methods, thus giving an absolute measure upon which to base the power control. In some situations, however, the signal quality of a user is not necessarily indicative of the actual transmitted power level from that user. One example of such a system employs spread spectrum random multiple access channels, in which the signal quality of each user is affected by the sum total of multiple access interference from all the other users. Thus, the system of FIG. 6 can have utility, although the preferred use of such a technique is in conjunction with a leader terminal, such as the system detailed in connection with FIG. 4. In that case, one of the demodulator/amplitude estimator pairs is used for the leader transmission, even though it is not broken out explicitly in FIG. 6.

Figure 7:
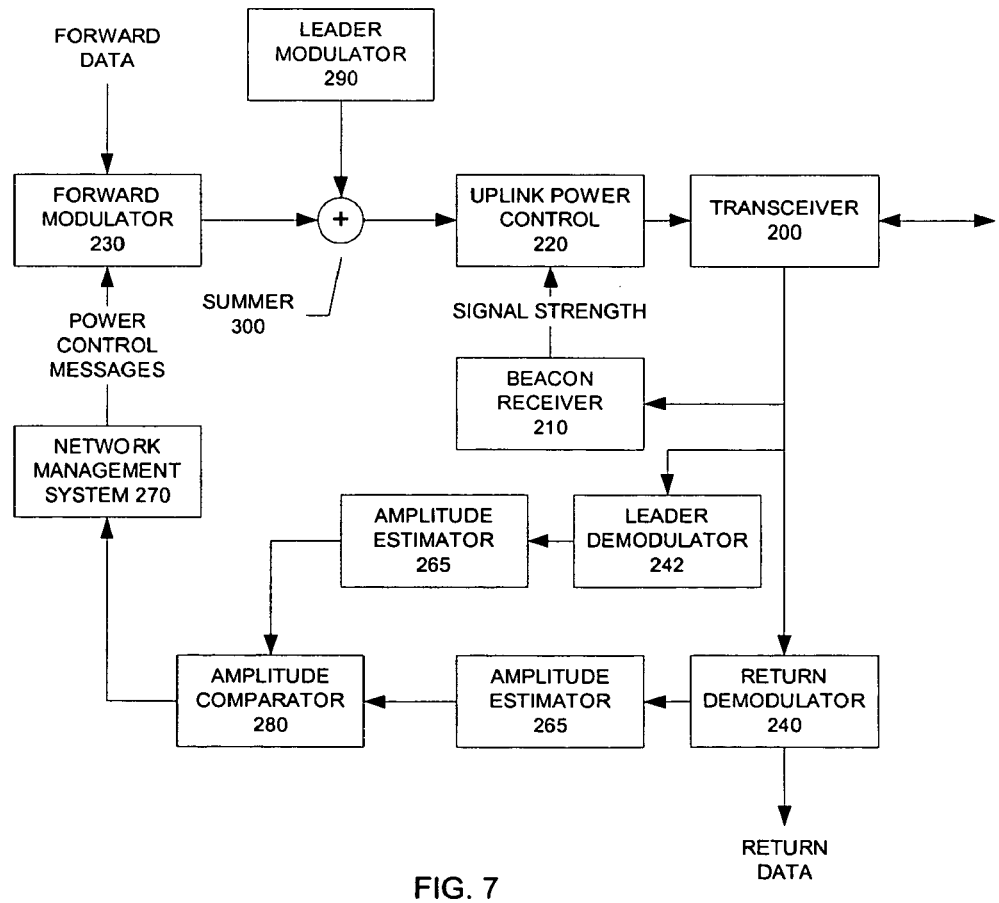
FIG. 7 is a block diagram showing an exemplary implementation of the hub portion of a leader follower power control system.

FIG. 7 is a block diagram illustrating a hub-based implementation of an exemplary embodiment of the leader-follower power control technique according to the invention. Here the output of forward modulator 230 is summed with the output of a leader modulator 290 at summer 300. This is typically accomplished at an IF frequency, but it may occur anywhere from baseband to above the eventual RF transmission frequency. This composite signal is then applied to the uplink power control unit 220 as described previously. The leader modulator 290 typically employs the same modulation techniques as the user subscriber terminals ST111–ST118, but this is not required.

This particular embodiment is favored because the leader uplink signal is controlled by the uplink power control unit 220 coincidentally with the forward signal. In many cases, the forward modulation is continuous, while the leader modulation is sporadic or aperiodic. In these cases, the uplink power control for the leader transmission is simplified by its integration with the forward uplink.

Figure 1:
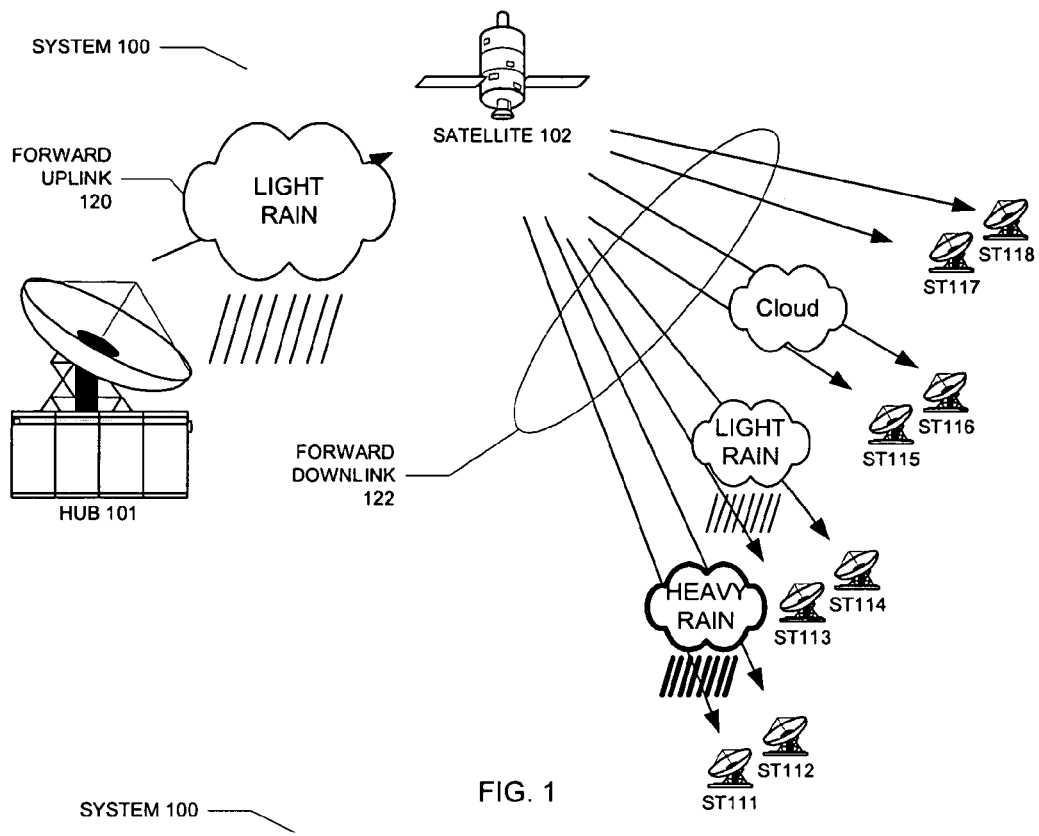
FIG. 1 is a block diagram showing an exemplary channel condition for the forward link transmissions from a hub to a variety of subscriber terminals through a bent pipe satellite relay.
Figure 2:
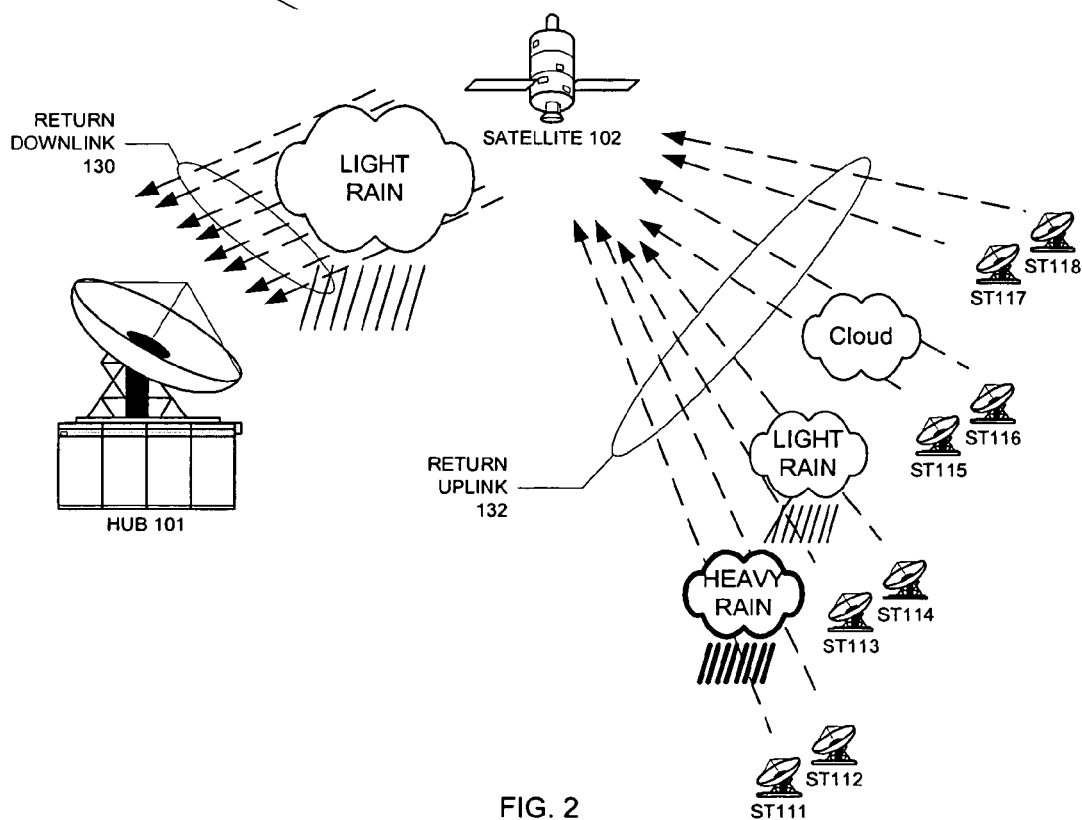
FIG. 2 is a block diagram showing an exemplary channel condition for return link transmissions from a number of subscriber terminals to a hub through satellite relay.
Figure 3:
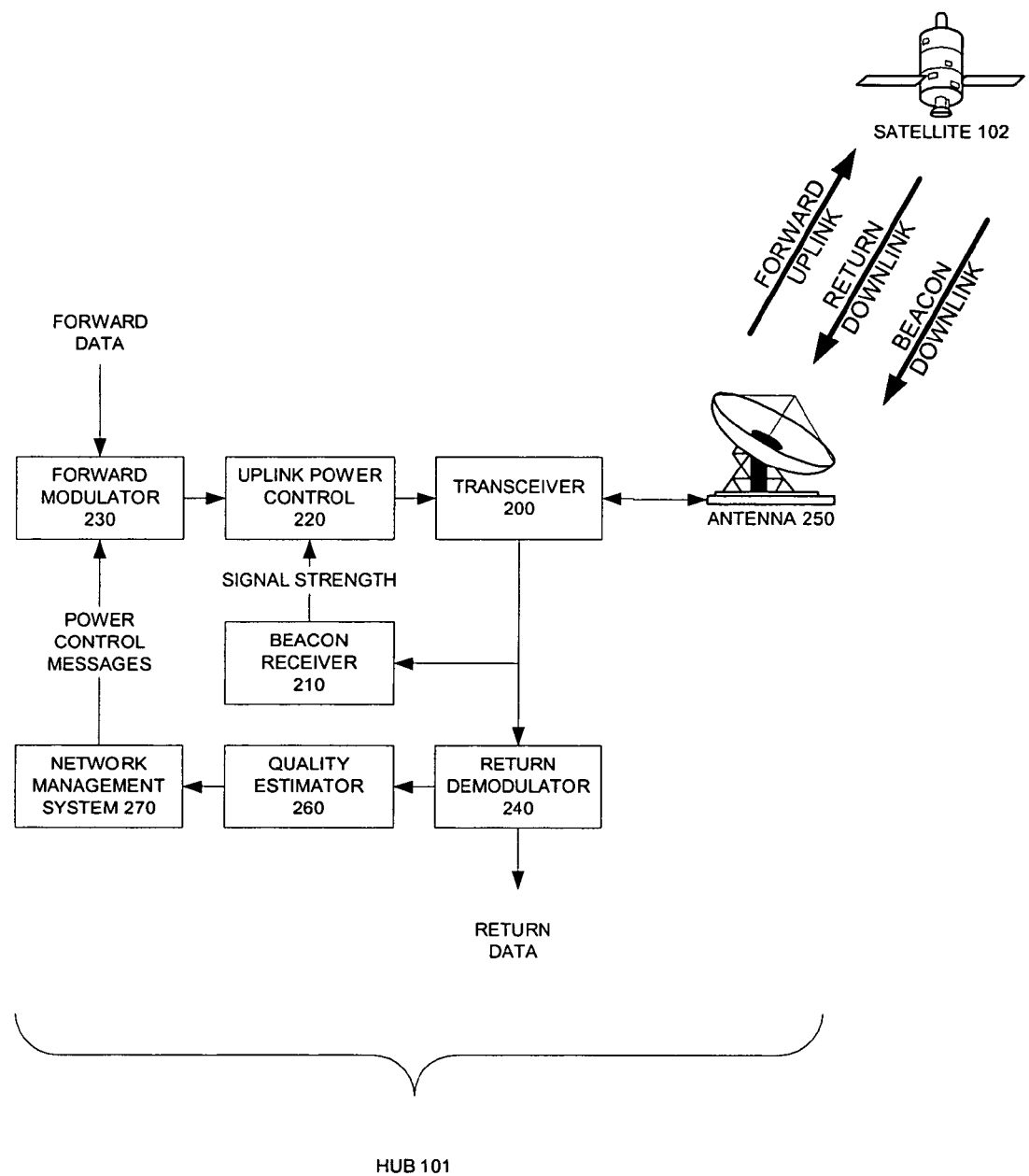
FIG. 3 is a block diagram showing an exemplary implementation of the hub portion of a power control system used to correct for degradations on the forward uplink channel and the combined return uplink and downlink channels.

Many different ways exist, however, to implement this leader signal. One example is via a completely independent terminal (as depicted in FIG. 3, element 103) operating its own independent uplink power control scheme. (The leader 103 need not share the uplink channel characteristics of the hub 101). Another example is a second channel on the uplink power control unit 220 that ties into the hub's transceiver 200 or use of an independent transceiver and/or antenna (not shown). The system designer is free to choose any number of implementations based on the unique configuration and interfaces of the hub.

The uplink power control unit 220 and beacon receiver 210 operate as described previously, although in this example the uplink power control unit 220 operates on a composite signal. The transceiver now has an added transmit and receive signal from the leader modulator 290. The receive signal that originated at the leader modulator is demodulated in leader demodulator 242, and the amplitude of the received signal is estimated in an amplitude estimator 265. Demodulation of the leader signal is not required. There is merely a need to identify the leader signal and estimate the amplitude of the received leader signal. The example shown merely requires addition of a demodulator and an amplitude estimator to the existing hub infrastructure. For a multiple user receiver that has the number of demodulators set by the number of simultaneous users that the channel will support, no additional demodulator or estimator is required. In such a case, the leader operates using one of a pool of demodulator/estimators that would otherwise be idle.

The amplitude estimate of the leader signal is then compared to the amplitude estimate of each user transmission in amplitude comparator 280. For example, if the leader and all the subscriber terminals employ a similar modulation frequency and spread-spectrum chip rate, then the leader may be precisely calibrated so that its signal arrived at the satellite at exactly the right level for all the user terminals' signals. The comparator 280 is implemented as a simple subtractor, with the amplitude error for each terminal being reported to the network management system 270, which then sends power control messages to the subscriber terminals to implement the power changes at the subscriber terminals.

Figure 8:
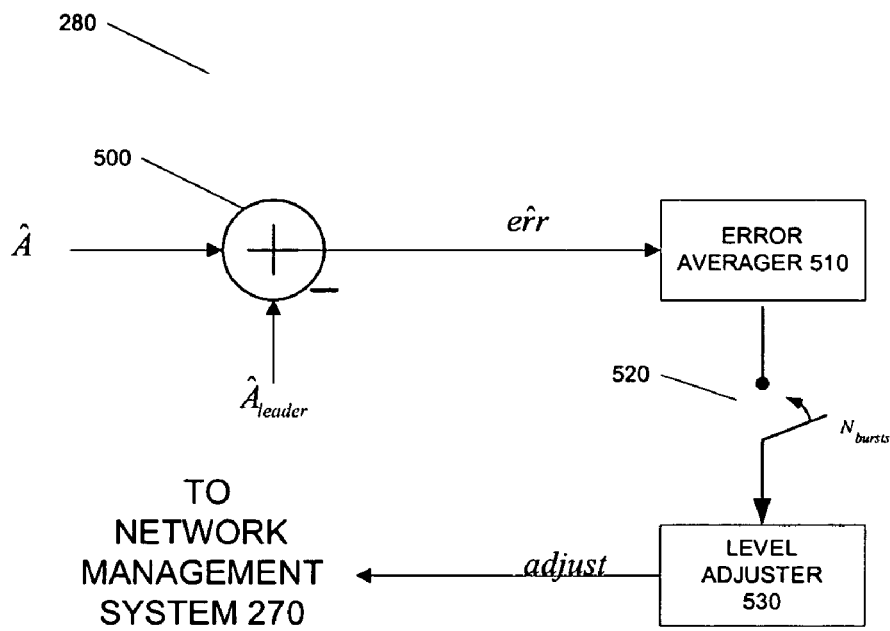
FIG. 8 is a block diagram showing an exemplary implementation of an amplitude comparator of the system of FIG. 7

One illustrative example of such a subtractive method is shown in FIG. 8. In this example, it is assumed that the automatic gain controls (AGCs) in the hub receiver system are relatively slow and the leader 103 is sending reference bursts fast enough such that the changes in these AGCs are negligible. A simple first order control loop is implemented for each ST under automatic power control. For each ST, the amplitude error observed on its packets drives a loop filter that provides feedback control of its transmit power level. The notional form of the control loop for the ST is shown in FIG. 8. $\hat{A}_i$ is the normalized amplitude estimate from a given ST, and $\hat{A}_{leader}$ is the normalized amplitude estimate from the most recent "leader" burst. Each individual error $err_i$ is calculated using summer 500, implemented as a subtractor by inverting the leader's input. The errors are averaged over the observation interval of $N_{bursts}$ bursts using error averager 510, implemented as $$\bar{err} = \frac{1}{N_{bursts}} \cdot \sum_{N_{bursts}} \hat{err}_i.$$

Every $N_{sample}$ bursts, the output of the error averager 510 is sent to the level adjuster 530 by sampler 520. Typical applications will use $N_{sample}=N_{bursts}$, but this is not required.

Figure 9:
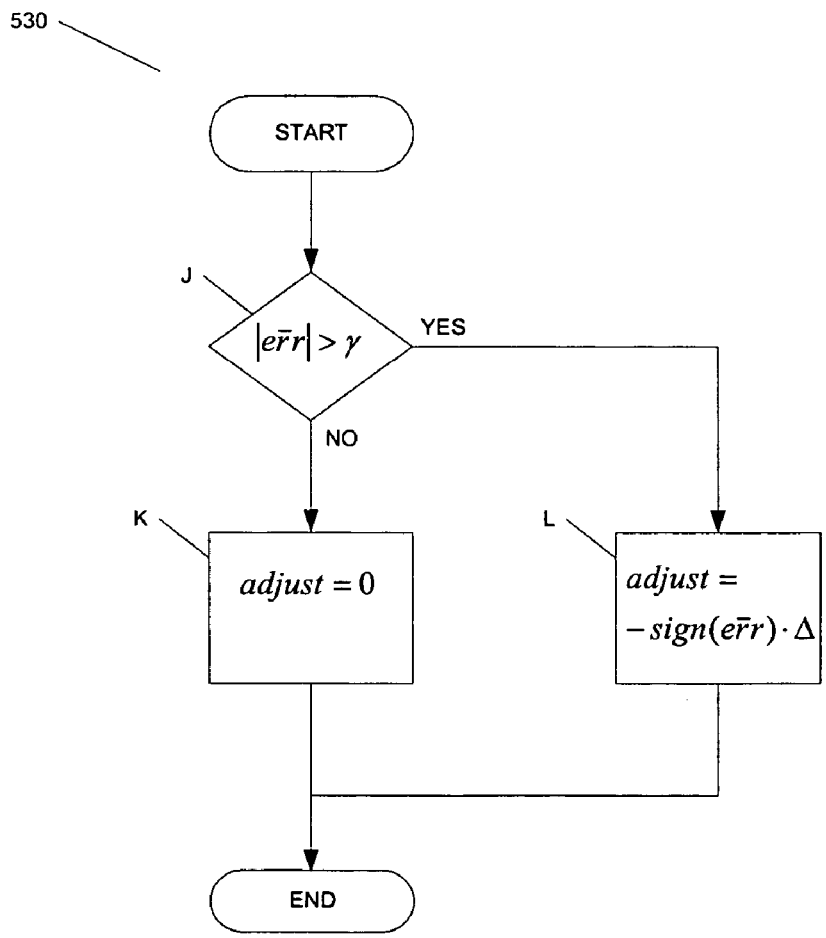
FIG. 9 is a flow chart illustrating a level adjuster in the comparator of FIG. 8.

FIG. 9 is a flow diagram of the level adjuster 530. The average error, $\bar{err}$, is compared to a threshold $\gamma$ (Step J). If the magnitude of the average error exceeds the threshold, then a correcting step adjustment is made (Step L) with step size $\Delta$ The sign of the error is used to determine whether the adjustment is positive or negative. If the magnitude of the average error is less than the threshold then no adjustment is made (Step K).

In general, the different subscriber terminals ST111–ST118 may use different transmission access types with possibly different center frequencies, data rates, spread spectrum code rates, etc. In these cases, the system designer can choose from a number of equivalent techniques to implement the comparator 280. For example, for a small number of user access types, it may be appropriate to use a different leader 103 for each type (or if one leader can be quickly adjusted, it could fill the leader role for multiple access types). Alternately, if the AGC in the receiver chain operates consistently across signals of all access types, then it is possible to compare leader signals of one access type with subscriber terminal signals using a different access type using the inherent relations between techniques and power levels.

Figure 10:
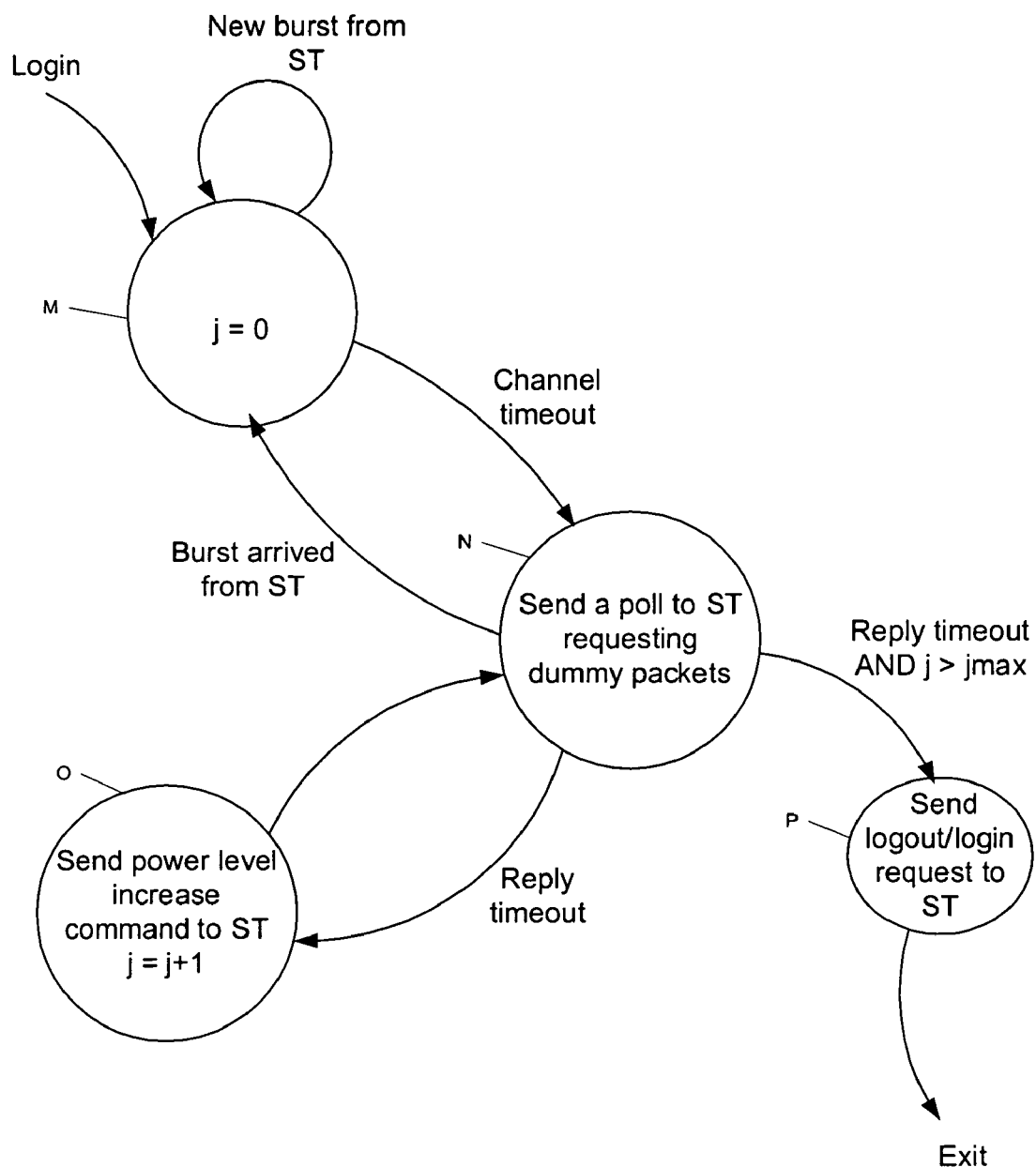
FIG. 10 is a state transition diagram of the operation of a network management system according to the invention.

In some systems, the subscriber terminals ST111–ST118 may transmit aperiodically, often so infrequently that the uplink channel may change substantially between bursts. In this case, the terminals ST111–ST118 should be set to transmit sufficiently frequently to follow channel dynamics. These transmissions can be initiated by the terminals themselves, or under direction of the network management system 270. FIG. 10 is a state transition diagram of an exemplary implementation of a state machine to perform these tasks in the network management system 270. This state machine is replicated for each ST as it logs into the network and enters State M. In State M, a counter j is initialized and a timer based on the dynamic rate of the channel is started. If a new burst arrives before this channel timer times out, then State M is re-entered, re-initializing counter j and the channel timer. This is the normal state for an ST that broadcasts on a regular, timely basis.

If the channel timer does fire (times out), then the state machine enters State N. Here, the network management system 270 polls the ST, requesting enough dummy packets to analyze the ST's channel. As well, a reply timer is also started. If a burst arrives before the reply timer has a chance to fire, the state machine transitions from N back to M.

If the reply timer does fire, the state machine enters State O, wherein the network management system 270 sends a message to the ST to increase its power. This is in case the ST has a degraded channel such that it cannot be heard by the hub 101, but has a good enough channel to receive the forward link from the hub. Also in State O, the counter j is incremented, thus j counts the number of times that the ST has been requested to increase power.

State O unconditionally returns to State N. where the poll is sent again and the reply timer restarted. The cycle back and forth between State N and State O (driven by the reply time outs) will be terminated, however, once the counter j has reached its maximum value jmax. At this point, the state machine enters State P, wherein one final message is sent to the ST, instructing it to log out of the network and log back in.

One of the many other equivalent techniques to accomplish this transmit time-out function is for the network management system to transmit a time-out value to a subscriber terminal, which would then transmit under local control when a local timer times out between subscriber terminal transmissions.

The subject invention may also incorporate a frequency sharing function like that described in U.S. Pat, Nos. 5,596,436; 6,011,952, and 6,725,017, commonly owned with the subject invention. In this case, the forward downlink and the return downlink each use at least some portion of the same frequency band. The forward downlink originates at the same hub where it is received together with the return downlink in what is called a composite downlink signal. The composite downlink signal may also include a satellite beacon signal. The beacon may reside either in the same shared frequency band or at another frequency. The frequency sharing is typically accomplished by correlating a delayed version of the forward uplink (also called the reference) signal with the composite downlink signal) to create an estimate of the component of the composite downlink signal that is due to the hub's own transmission. This self-interference component is then subtracted from the composite signal, leaving a signal that will ideally be equivalent to one that had been separated from the forward downlink by traditional methods such as frequency or time division.

Figure 11:
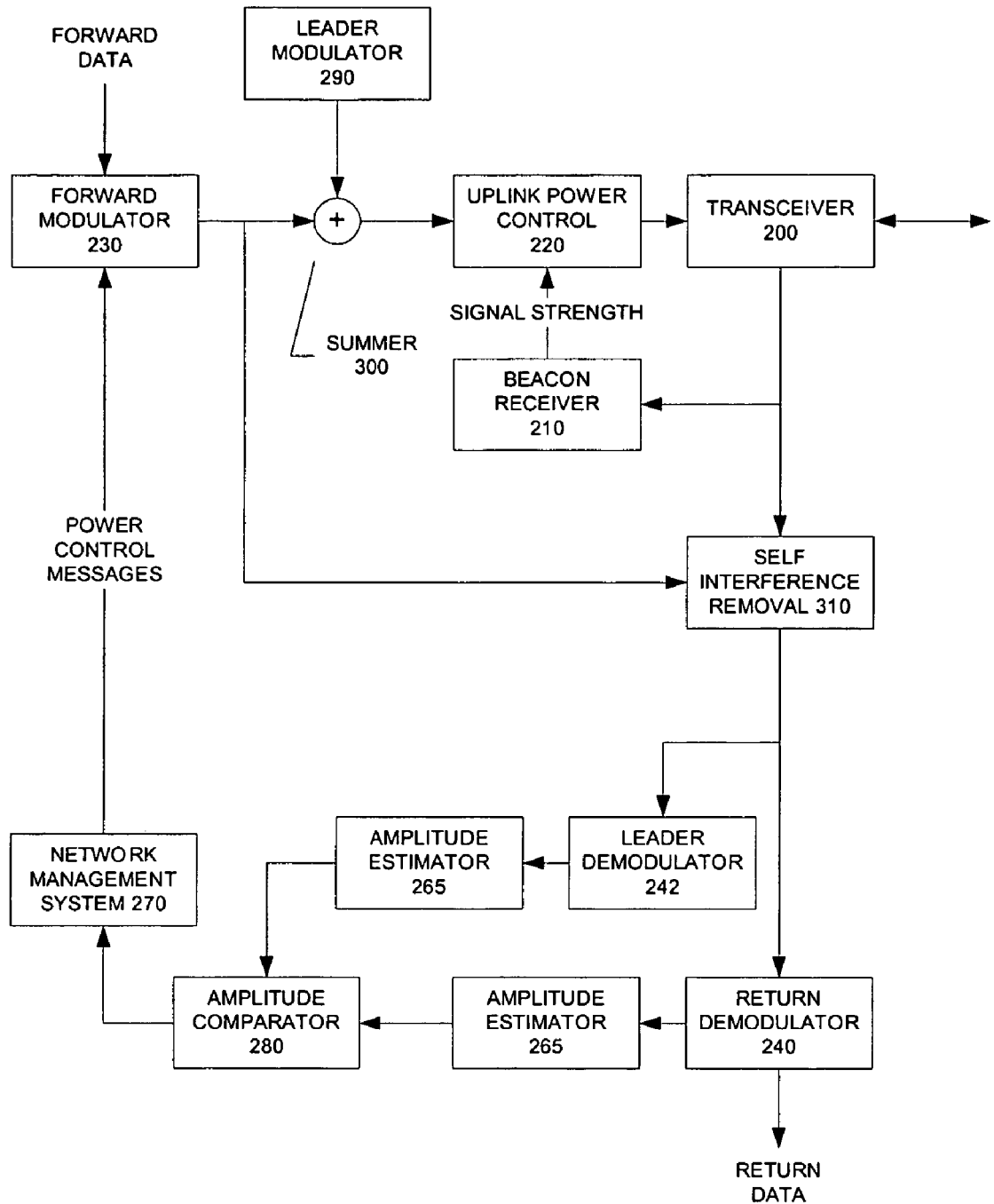
FIG. 11 is a block diagram showing an exemplary implementation of the hub portion of a power control system according to a further embodiment of the invention.

One illustrative method of performing self-interference removal in accordance with the subject invention is shown in FIG. 11. Here, a self-interference removal unit 310 is inserted into the received signal stream of the hub 101. In this example, the removal unit 310 is placed after the signal has been routed to the beacon receiver 210, although it could also equivalently be placed before the beacon receiver 210. This placement (not explicitly shown in any figure but implicit to FIG. 11) may be desired if the satellite beacon signal is also in the frequency band being shared by the forward and return downlink signals. Thus, the beacon receiver would also take advantage of the interference cancellation.

The output of the forward modulator 230, either at baseband, IF or RF, is used as a reference by the interference removal unit 310 to enable the unit to remove that portion of the composite received signal that is due to the transmission of the forward modulator 230, thus leaving the components due to the leader transmission and the user transmissions to be sent to the leader demodulator 242 and return demodulator 240. The modulator 230 output is taken before the addition of the leader modulator 290 output at summer 300. In general, this is a preferred embodiment, since the self-interference canceller 310 does not attempt to remove the leader downlink signal from the composite downlink. In practice, however, it often makes no difference if the leader signal is included in the reference signal, especially if the power of the forward downlink signal is much greater than then the power of the leader downlink signal.

Figure 12:
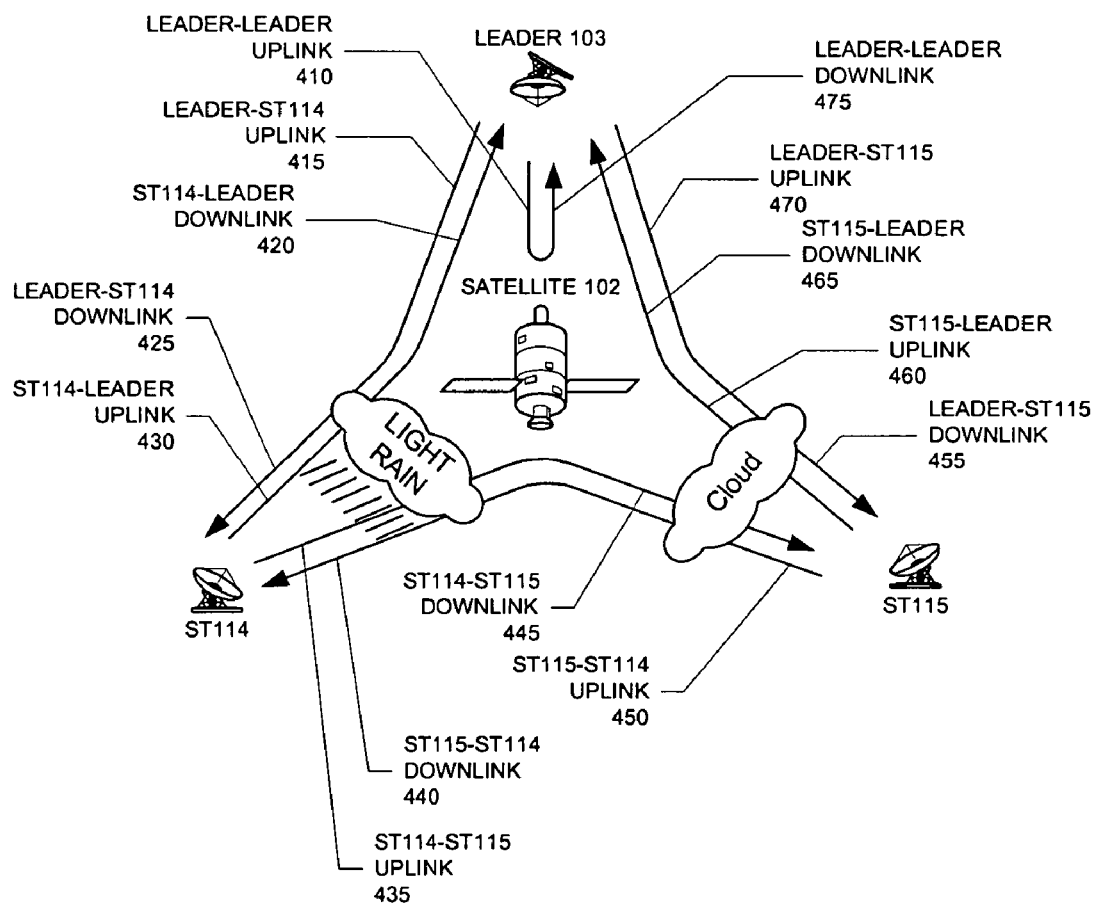
FIG. 12 is a block diagram showing an exemplary channel condition for return link transmissions from a number of subscriber terminals to one another using a single peer leader terminal as a calibration source through satellite relay.

FIG. 12 illustrates an embodiment of the subject invention operating in a mesh satellite network. Here, the downlinks do not share the same path (to the hub 101), so a modified calibration technique is used. Each communicating terminal pair (ST114 and ST115 in this example) share an uplink and downlink path. Local conditions at ST114 (light rain, in this example) simultaneously affect the path from ST114 to ST115 (ST114–ST115 uplink 435), the path from ST115 to ST114 (ST115–ST114 downlink 440), the path from ST114 to the leader (ST114-Leader uplink 430), and the path from the leader to ST114 (Leader-ST114 downlink 425). Similarly, ST115's local conditions (cloud, in this example) simultaneously affect the path from ST114 to ST115 (ST114–ST115 downlink 445), the path from ST115 to ST114 (ST115–ST114 uplink 450), the path from ST115 to the leader (ST115-Leader uplink 460), and the path from the leader to ST115 (Leader-ST115 downlink 455). The leaders local conditions (clear sky, in this example), simultaneously affect the path from ST114 to the leader (ST114-Leader downlink 420), the path from the leader to ST114 (Leader-ST114 uplink 415), the path from ST115 to the leader (ST115-Leader downlink 465), the path from the leader to ST115 (Leader-ST115 uplink 455), and finally, the path from the leader back to itself, both the leader-leader uplink 410 and the leader-leader downlink 475.

To set the power of any ST at the satellite, the calibrated leader 103 simply operates with full hub functions for calibration purposes, such as in the hub-spoke system, namely, comparing its own downlink path characteristics 475 to those from the STs (420 and 465). The leader 103 may be able to eavesdrop on the communication between ST114 and ST115 due to the broadcast nature of the satellite. Extra receivers may be required at the leader 103 if the differing STs broadcast simultaneously. Alternatively, dedicated power control messages may be transferred between the parties. The requirement for consistent sounding to track the channel will remain unchanged from the hub-spoke system.

The invention has been explained with reference to specific embodiments and examples. Other embodiments will be evident to those of skill in the art. Therefore, it is not intended that the invention be limited, except as indicated by the appended claims.

What is claimed is:

1. In a relayed communication system having a hub and a plurality of subscriber terminals coupled for communication with one another via an elevated wireless relay operative in a bent pipe mode through a forward uplink path from the hub, a forward downlink path to the subscriber terminals, a return uplink path from the subscriber terminals, and a return downlink path to the hub, a method for transmit power level control at the subscriber terminals comprising:
   providing a calibrated transmit signal terminal operative as a leader terminal and having a leader uplink from the leader terminal and a leader downlink to the hub so that the leader terminal experiences a downlink propagation path that approximates all subscriber terminal downlink propagation paths;
   causing the leader terminal to calibrate its power level using power levels of its leader uplink and leader downlink;
   generating leader testing signals at the leader terminal via the leader uplink;
   generating subscriber testing signals at the subscriber terminals via the subscriber uplink;
   estimating leader terminal power level received at the hub;
   comparing the respective subscriber terminal power levels with the leader terminal power level to produce an error signal; and
   using the error signal to produce a control signal to control the transmit power level of the subscriber terminals.

2. The method according to claim 1 wherein the comparing step is operative at the hub.

3. The method according to claim 2 wherein the hub communicates at least one of an error signal and a control signal to the subscriber terminals.

4. The method according to claim 1 wherein the comparing step is performed at each subscriber terminal.

5. The method according to claim 4 wherein the hub communicates the leader terminal power level estimate and a measured specific subscriber terminal power level to each corresponding specific subscriber terminal.

6. The method according to claim 5 wherein the error signal using step is performed at the subscriber terminal.

7. The method according to claim 5 wherein the communicating of the leader terminal power level estimate to the other subscriber terminals is via traffic through the forward downlink.

8. The method according to claim 1 wherein the leader terminal is collocated with the hub.

9. The method according to claim 1 wherein the leader terminal is remotely located away from the hub.

10. The method according to claim 1 wherein the subscriber testing signals comprise burst signals of dummy data from the subscriber terminals.

11. The method according to claim 10 wherein the dummy data is encoded with an error detection code.

12. The method according to claim 1 wherein the subscriber testing signals comprise normal message traffic from the subscriber terminals.

13. In a wireless communication system having a plurality of terminals operative to communicate via a wireless relay apparatus, the wireless relay apparatus being operative to support at least one uplink path and at least one downlink path wherein output power of a relay downlink signal is a function of input power of a relay uplink signal received by the relay apparatus, a method for controlling power level of the relay uplink signal provided by the terminals comprising:
   providing a leader terminal for communication of a calibration signal via a leader uplink path to the relay apparatus for testing the at least one downlink path, the leader uplink path being calibrated from the leader terminal to the relay apparatus, and further providing a leader downlink path from the relay apparatus in a form so that any terminal that receives at least the downlink signal originating from the leader terminal experiences a downlink signal propagation path from the relay apparatus that approximates downlink propagation paths of at least one other terminal;
   causing the leader terminal to transmit channel testing message signals via the leader uplink path to test the downlink propagation paths; thereafter
   measuring power levels of the relay downlink signal from the leader terminal and the relay downlink signal from at least one other terminal as received via a common downlink propagation path at at least one of the leader terminal and one other terminal;
   comparing the measured power level from at least one of the relay downlink signals with the measured power level from the leader terminal downlink signal to produce an error signal; and
   using the error signal to produce a control signal to regulate the transmit power level of at least one the terminals in order to regulate power level on the relay uplink path and thereby on the relay downlink path.

14. The method according to claim 13 wherein said wireless communication system has a hub-spoke configuration with the hub terminal and a plurality of subscriber terminals.

15. The method according to claim 14 wherein the leader terminal is collocated with a hub terminal.

16. The method according to claim 15 wherein the leader terminal shares uplink power control with the hub terminal.

17. The method according to claim 14 wherein the measuring step and the comparing step are performed at the hub terminal.

18. The method according to claim 14 wherein the leader terminal is remotely located relative to a hub terminal and does not share the relay downlink path with the hub terminal.

19. The method according to claim 14 wherein selected other terminals generate testing signals in addition to traffic signals.

20. The method according to claim 14 wherein the leader terminal shares transmission and reception frequency with at least one other terminal.

21. The method according to claim 13 wherein the leader terminal shares transmission and reception frequency with at least one other terminal.

22. The method according to claim 13 wherein said wireless communication system has a mesh configuration.

23. The method according to claim 22 wherein the leader terminal is remotely located relative to a controlling terminal, said controlling terminal not sharing the relay uplink paths with all other terminals, and the leader terminal not sharing the relay downlink path with the controlling terminal.

24. The method according to claim 22 wherein the measuring step and the comparing step are performed at the leader terminal.

25. The method according to claim 22 wherein selected other terminals generate testing signals in addition to traffic signals.

26. A subscriber terminal for use in a satellite communication system having a leader terminal and a plurality of subscriber terminals coupled for communication with one another via a satellite operative in a bent pipe mode or via other wireless relay apparatus operative such that output power of a relay downlink signal is a function of input power of a relay uplink signal received by the relay apparatus, a forward downlink path to the subscriber terminals, a return uplink path from the subscriber terminals, a return leader downlink path to the leader terminal, and a transmitter at the leader terminal operative to generate power level testing signals on a leader uplink path, the subscriber terminal comprising:

a receiver operative to receive error and control information from the leader terminal via the forward downlink path for use in adjusting transmit power levels;

a control system for automatically adjusting transmit power level on its own return uplink path in response to error signals comparing leader terminal transmit signals and self transmitted signals on the return leader downlink path; and a transmitter coupled to said control system operative to generate power level adjusted signals on said own return uplink path.

27. The subscriber terminal according to claim 26 wherein the receiver is operative to receive the error and control information via the forward downlink path.

28. The subscriber terminal according to claim 26 wherein the receiver is operative receive a leader terminal power level estimate and a measured subscriber terminal power level, and wherein the control system is operative to compare the leader terminal power level estimate and the measured subscriber terminal power level to formulate return uplink power level control.

29. The subscriber terminal according to claim 26 wherein the receiver is operative receive an error signal based on the leader terminal power level estimate and the measured subscriber terminal power level; and wherein the control system is operative to formulate return uplink power level control.

30. The subscriber terminal according to claim 26 wherein the receiver is operative receive a control signal and wherein the control system is operative to regulate return uplink power level in response to the control signal.

31. In a wireless communication system having a plurality of terminals operative to communicate via a wireless relay apparatus, the wireless relay apparatus being operative to support at least one uplink path and at least one downlink path wherein output power of a relay downlink signal is a function of input power of a relay uplink signal received by the relay apparatus, an apparatus for controlling power level of the relay uplink signal provided by the terminals comprising:

a leader terminal for communication of a calibration signal via a leader uplink path to the relay apparatus for testing the at least one downlink path, the leader uplink path being calibrated from the leader terminal to the relay apparatus, and further providing a leader downlink path from the relay apparatus in a form so that any terminal that receives at least the downlink signal originating from the leader terminal experiences a downlink signal propagation path from the relay apparatus that approximates downlink propagation paths of at least one other terminal;

a message generator at the leader terminal to transmit channel testing message signals via the leader uplink path to test the downlink propagation paths; thereafter power level measurers for measuring power of the relay downlink signal from the leader terminal and the relay downlink signal from at least one other terminal as received via a common downlink propagation path at at least one of the leader terminal and one other terminal;

a comparator for comparing the measured power level from at least one of the relay downlink signals with the measured power level from the leader terminal downlink signal to produce an error signal; and a controller using the error signal to produce a control signal to regulate the transmit power level of at least one the terminals in order to regulate power level on the relay uplink path and thereby on the relay downlink path.

* * * * *

UNITED STATES PATENT AND TRADEMARK OFFICE
CERTIFICATE OF CORRECTION

PATENT NO. : 7,110,717 B2 Page 1 of 1
APPLICATION NO. : 10/903126
DATED : September 19, 2006
INVENTOR(S) : Mark J. Miller et al.

It is certified that error appears in the above-identified patent and that said Letters Patent is hereby corrected as shown below:

Column 1, line 27, "EIRP" should be changed to -- EIRP (Effective Isotropically Radiated Power) --

Column 7, line 12, "FIG. 5B, Step E.," should be changed to -- FIG. 5B, Step E. --

Column 7, lines 29-30, "FIG. 5" should be changed to -- FIG. 3 --

Column 8, line 13, "FIG. 3" should be changed to -- FIG. 4 --

Column 8, line 64, "A" should be changed to -- A 1 --

Column 8, line 66, "Err" should be changed to -- Err 1 --

Column 9, lines 17-18, "step size Delta The" should be changed to -- step size Delta. The --

Column 11, line 20, "(Leader-ST115 uplink 455)" should be changed to -- (Leader-ST115 uplink 470) --

Signed and Sealed this

Sixth Day of January, 2009

JON W. DUDAS
*Director of the United States Patent and Trademark Office*